United States Patent
Hedrington et al.

(10) Patent No.: US 6,354,194 B1
(45) Date of Patent: *Mar. 12, 2002

(54) ROTATABLE COOKING APPARATUS

(75) Inventors: James Alan Hedrington, Chippewa Falls; Brent William Dressel, Elk Mound, both of WI (US)

(73) Assignee: National Presto Industries, Inc., Eau Claire, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/503,377

(22) Filed: Feb. 14, 2000

Related U.S. Application Data (63) Continuation of application No. 09/267,981, filed on Mar. 12, 1999.

(51) Int. Cl.$^7$ .............................. A23L 1/01; A47J 37/04
(52) U.S. Cl. .............................. 99/341; 99/392; 99/399; 99/401; 99/423; 99/427; 99/443 R
(58) Field of Search ............................ 99/341, 391–392, 99/399, 401, 423, 389, 443 R, 427

(56) References Cited

U.S. PATENT DOCUMENTS

| | | |
|---|---|---|
| 563,032 A | 6/1896 | Hadaway, Jr. |
| 950,058 A | 2/1910 | Shailor |
| 1,054,321 A | 2/1913 | Sinks |
| 1,140,338 A * | 5/1915 | Serrill |
| 1,406,372 A | 2/1922 | Grapp |
| 1,477,343 A | 12/1923 | Griffin |
| 2,047,046 A | 7/1936 | Wade |
| 2,168,773 A | 8/1939 | Parr |
| 2,317,225 A | 4/1943 | Schara .......................... 53/10 |
| 2,438,699 A * | 3/1948 | Groetchen ................... 99/427 |
| 2,542,406 A | 2/1951 | Flajole |
| 2,646,495 A | 7/1953 | Dornbush |
| 2,659,800 A | 11/1953 | Zander |
| 2,740,395 A * | 4/1956 | Goodwin ..................... 126/25 |
| 2,920,177 A | 1/1960 | Brane |
| 3,095,186 A | 6/1963 | Sondy ........................... 263/7 |
| 3,204,549 A | 9/1965 | Pawlosky |
| 3,244,859 A | 4/1966 | Whiteford |
| 3,277,813 A | 10/1966 | Luscher |
| 3,456,579 A | 7/1969 | Woods ........................ 99/341 |

(List continued on next page.)

FOREIGN PATENT DOCUMENTS

| | | |
|---|---|---|
| DE | 94 09 321.0 | 10/1994 |
| FR | 2 390 137 | 12/1978 |
| FR | 2 394 279 | 12/1979 |

(List continued on next page.)

OTHER PUBLICATIONS

Exhibit A Photographs of an oven by National, SEG, Turn Toaster NT–101 (7 pages), (Date N.A.).

Primary Examiner—Keith Hendricks
Assistant Examiner—Drew Becker
(74) Attorney, Agent, or Firm—Merchant & Gould P.C.

(57) ABSTRACT

A cooking apparatus is provided which includes a rotatable food support member for supporting a food item thereon. A drive mechanism is connected to the food support member for rotating the food support member. The cooking apparatus further includes upper and lower housings disposed above and beneath a portion of the food support member. The upper and lower housings include an upper and lower heating member respectively with each of the upper and lower heating members providing a heat output which varies from a first end adjacent to an outer edge of the food support member to a second end adjacent to an inner center portion of the food support member, wherein the heat output is greater at the first end than at the second end. The drive mechanism rotates the food support member with the upper and lower heating members applying heat to the food support member to cook the food item contained thereon. Preferably, the food support member includes a solid base portion for supporting the food item.

14 Claims, 10 Drawing Sheets

U.S. PATENT DOCUMENTS

| | | |
|---|---|---|
| 3,604,338 A | 9/1971 | Fiedler |
| 3,610,885 A | 10/1971 | Zingg ..................... 219/461 |
| 3,693,536 A | 9/1972 | Carville et al. |
| 3,744,403 A | 7/1973 | Castronuovo |
| 3,828,163 A | 8/1974 | Amagami et al. |
| D244,444 S | 5/1977 | Bessier et al. ................. D15/8 |
| 4,068,569 A | 1/1978 | Munsey |
| 4,238,669 A | 12/1980 | Huntley |
| 4,305,329 A | 12/1981 | Fenoglio |
| 4,378,729 A | 4/1983 | Pierick |
| D272,509 S | 2/1984 | Hirose et al. ................. D7/365 |
| 4,487,116 A | 12/1984 | Routhier ..................... 99/339 |
| 4,506,652 A | 3/1985 | Baker et al. |
| D286,368 S | 10/1986 | Henke et al. ................. D7/338 |
| 4,664,025 A | 5/1987 | Martinez ..................... 99/331 |
| 4,683,813 A | 8/1987 | Schultz ..................... 99/353 |
| D295,251 S | 4/1988 | Veniat ..................... D7/328 |
| 4,805,587 A | 2/1989 | Schweitzer |
| 4,924,763 A | 5/1990 | Bingham |
| 4,960,977 A | 10/1990 | Alden |
| 5,000,083 A | 3/1991 | Pickave |
| 5,039,535 A | 8/1991 | Lang et al. |
| 5,253,565 A | 10/1993 | Burton ..................... 99/374 |
| 5,378,872 A | 1/1995 | Jovanovic |
| 5,398,666 A | 3/1995 | Smith et al. |
| 5,404,798 A | 4/1995 | Omarini |
| 5,441,035 A | 8/1995 | Liang-Chieh ............. 126/21 R |
| 5,492,055 A | 2/1996 | Nevin et al. |
| 5,496,987 A | 3/1996 | Siccardi et al. |
| 5,503,063 A | 4/1996 | Sebald ..................... 99/447 |
| D374,790 S | 10/1996 | Hsu ..................... D7/332 |
| 5,586,488 A | 12/1996 | Liu |
| D379,733 S | 6/1997 | Liu et al. ..................... D7/337 |
| 5,676,044 A | 10/1997 | Lara, Jr. ..................... 99/331 |
| 5,845,563 A | 12/1998 | Haring et al. ................. 99/419 |
| 6,089,144 A * | 7/2000 | Garber et al. ................. 99/331 |
| D429,441 S | 8/2000 | Garber et al. ................. D7/352 |
| 6,125,740 A | 10/2000 | Hedrington et al. .......... 99/392 |
| D439,792 S | 4/2001 | Hedrington et al. ......... D7/323 |

FOREIGN PATENT DOCUMENTS

| | | |
|---|---|---|
| IT | 709916 | 6/1966 |
| JP | 55-68537 | 5/1980 |
| JP | 59-112132 | 6/1984 |
| JP | 64-691 | 1/1989 |
| JP | 1-111143 | 4/1989 |
| JP | 64-90929 | 4/1989 |
| JP | 1-142329 | 6/1989 |
| JP | 6-94245 | 4/1994 |
| JP | 6-213464 | 8/1994 |
| SU | 1629014 A1 | 2/1991 |
| WO | WO 94/28692 | 12/1994 |
| WO | WO 98/30140 | 7/1998 |
| WO | WO 99/55210 | 11/1999 |
| WO | WO 99/55602 | 11/1999 |

* cited by examiner

ROTATABLE COOKING APPARATUS

This application is a Continuation of application Ser. No. 09/267,981, filed Mar. 12, 1999, which application(s) are incorporated herein by reference. Application Ser. No. 09/267,981 issued as U.S. Pat. No. 6,125,740 on Oct. 3, 2000. This invention relates generally to the field of electric ovens and more particularly to a rotatable cooking apparatus for cooking food items such as a pizza.

BACKGROUND OF THE INVENTION

1. Field of the Invention

This invention relates generally to the field of electric ovens and more particularly to a rotatable cooking apparatus for cooking food items such as a pizza.

2. Description of the Art

In the field of food preparation and particularly cooking of pizzas, it is well known to utilize a conventional electric oven. However, several common problems are associated with using a conventional oven such as having to wait to preheat the oven to begin cooking and uneven cooking of the pizza in the oven. For example, a conventional oven often has hot spots where heat is concentrated in a particular area of the oven and this leads to overcooking a portion of the pizza adjacent the hot spot while other portions of the pizza may not be fully cooked. Often it is difficult to ensure that the crust of the pizza is fully cooked without overcooking the top of the pizza. Additionally, cooking the pizza often results in drippings of toppings and other ingredients which fall onto the surfaces of the oven.

In view of the problems associated with using a conventional oven to cook a pizza, it is known in the field of electric ovens to have an electric oven specifically designed for use in cooking pizzas or other similar types of foods. For example, U.S. Pat. No. 5,496,987 is directed to an electric oven particularly designed for cooking pizzas. In such a device, the oven includes heating coils which are supported above a base portion of the oven so that an entire pizza can be positioned between the coils for cooking the pizza. One problem with such a device is that since the heating coils extend over the entire portion of the pizza, the size or "footprint" of the oven is relatively large and is not efficient for use or storage by a consumer in a kitchen environment, for example on a kitchen counter.

U.S. Pat. No. 5,586,488 discloses a portable pizza oven which includes a fixed upper and lower casing having an upper heater assembly and a lower heater assembly located within the casings. A pan is insertable into the cooking chamber so that the entire pizza is disposed between the upper and lower heater assemblies to cook the pizza. Again the size of the device is cumbersome or inefficient for a consumer as the upper and lower casings containing the heater assembly are sized so that an entire pizza can fit within the upper and lower casing.

What is needed is an apparatus which provides for fast, efficient cooking of a food item such as a pizza and which is convenient and efficient in a kitchen environment by having a relatively small footprint for easy use and storage. What is further needed is an apparatus for cooking a pizza or other food item in which the application of heat to the food item is applied in such a way to allow even cooking of the food item throughout the entire food item.

SUMMARY OF THE INVENTION

The present invention is directed to a cooking apparatus which allows for fast, efficient cooking of a food item such as a pizza while providing proportionate heating throughout the entire pizza to ensure that the entire pizza is cooked evenly and completely. The present invention further provides a cooking apparatus which has a small footprint for efficient use and storage by a consumer in a kitchen environment.

According to one aspect of the present invention, a cooking apparatus is provided which includes a rotatable food support member for retaining a food item thereon. A drive mechanism is connected to the food support member for rotating the food support member. The cooking apparatus further includes upper and lower housings disposed above and beneath the food support member. The upper and lower housings include an upper and lower heating member respectively with each of the upper and lower heating members providing a heat output which varies from a first end adjacent to an outer edge of the food support member to a second end adjacent to an inner center portion of the food support member. The heat output is greater at the first end than at the second end. The drive mechanism rotates the food support member with the upper and lower heating members applying heat to the food support member to cook the food item.

In one embodiment, the upper and lower housings define a substantially pie-shaped portion having a front end and diverging sides so as to cover a pie-shaped sector of the food support member. Preferably, the substantially pie-shaped portion of the food support member covered by the upper and lower housings is equal to or less than about one-quarter of the total area of the food support member. Preferably, the upper and lower heating members each provide a heat output which varies from a first end adjacent to an outer edge of the food support member to a second end adjacent to an inner center portion of the food support member so that the heat output is greater at the first end than at the second end. In such an embodiment, the drive mechanism rotates the food support member with the upper and lower heating members applying heat to a pie-shaped sector of the pizza or other food item carried by the food support member to cook the food item.

According to another aspect of the present invention, the rotatable food support member preferably comprises a solid base portion for supporting the food item such as a pizza. Preferably, the surface of the solid base portion of the food support member includes a series of interruptions in the surface such as a waffle pattern such that air pockets are created therein to assist in the browning of the crust of the pizza. Preferably, the food support member includes a downwardly extending annular rim which assists in retaining heat under the solid base portion of the food support member.

Pursuant to another aspect of the present invention, the upper and lower heating members preferably comprise metal sheathed heating elements and are arranged in a substantially pie-shaped orientation such that a greater portion of the heating elements are disposed toward the outer edge of the heating members than toward the front end of heating members adjacent the center of the food support member. Preferably, the upper and lower heating members are enclosed by an outer wall such that the heat is directed toward the food support member. In one embodiment, the annular rim of the food support member is disposed adjacent an outer edge portion of the outer wall of the lower heating member such that the heating element of the lower heating member is substantially enclosed between the food support member and the outer wall of the lower heating member.

The above-described features and advantages, along with various other advantages and features of novelty, are pointed out with particularity in the claims of the present application which form a part hereof. However, for a better understanding of the invention, its advantages, and objects obtained by its use, reference should be made to the drawings which form a further part of the present application and to the accompanying descriptive matter in which there is illustrated and described preferred embodiments of the invention.

DETAILED DESCRIPTION OF THE INVENTION

Figure 1:
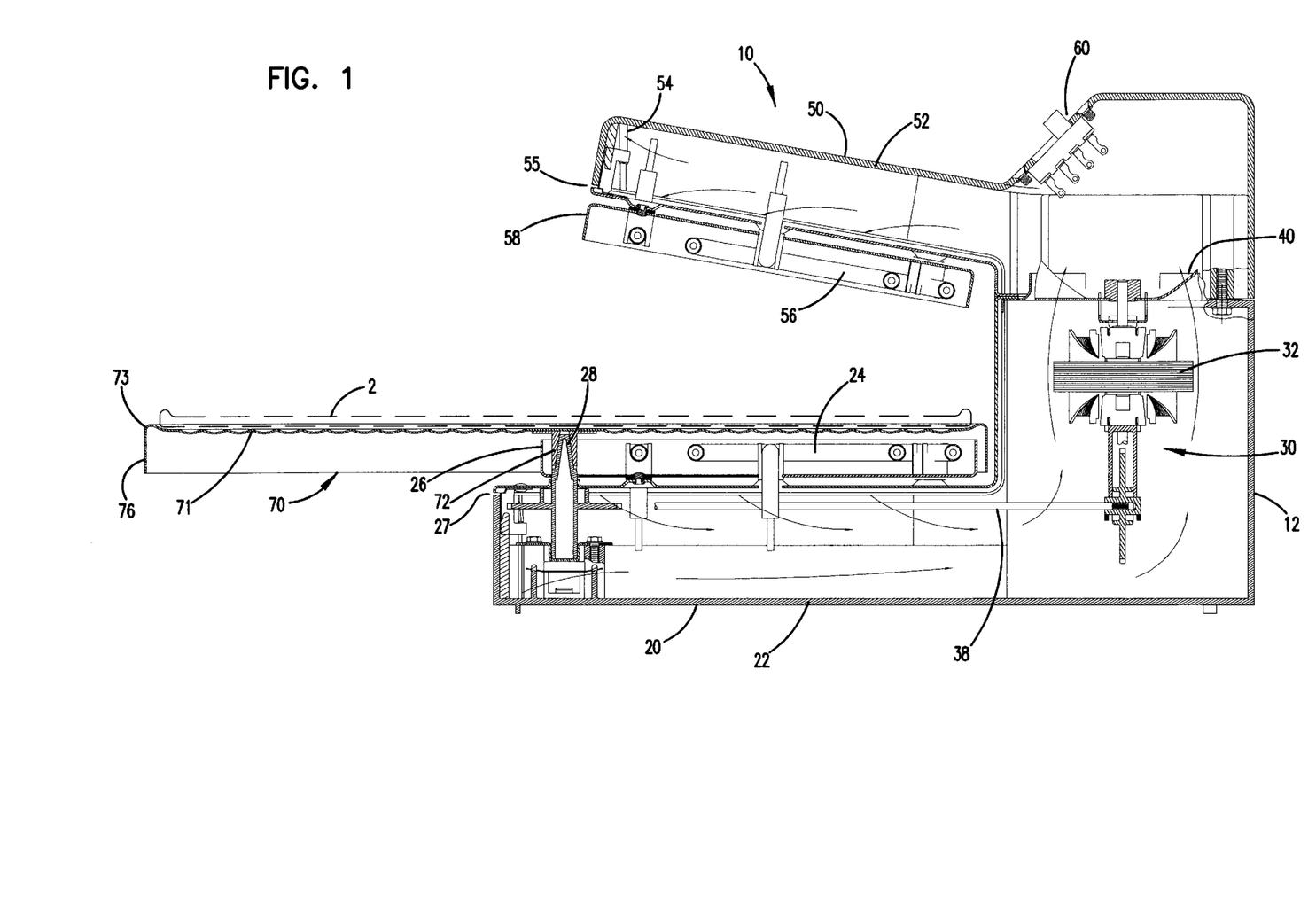
FIG. 1 is a side sectional view of one preferred embodiment of a rotatable cooking apparatus according to the principles of the present invention.

Referring now to the drawings in which similar elements are numbered identically throughout, a description of the preferred embodiments is provided. In FIG. 1, a side sectional view of a cooking apparatus according to the principles of the present invention is generally illustrated at 10. The cooking apparatus generally includes a base portion 12 and a lower housing 20 and an upper housing 50 extending forward from the base portion 12. The lower housing 20 includes a base or shell portion 22 and includes a substantially pie-shaped heating member 24. Preferably, an outer wall or rim 26 encloses heating member 24. In this way, heat generated by the heating member 24 is generally directed upward toward a portion of a moveable food support member 70. The lower housing 20 includes a rotatable shaft 28 which is sized for engagement with a corresponding shaft 72 of the food support member 70. In one embodiment, the lower housing 20 includes side extensions 21 which provide additional support for the lower housing as well as providing additional spacing between the heating member 24 and objects adjacent the apparatus.

The base or shell portion 22 of the lower housing 20 preferably includes air intake apertures 23 which help assist in air circulation throughout the cooking apparatus to cool the apparatus. In one embodiment, a clearance or gap 27 is provided between the base portion 22 and a top portion of the lower housing 20 to allow for improved air flow. Similarly, the upper housing 50 preferably has a clearance or gap 55 to allow for improved air flow.

The cooking apparatus 10 includes a drive mechanism 30 for rotation of the food support member 70 which is disposed between the upper and lower housings 20, 50. In one embodiment, the drive mechanism 30 includes an electric motor 32 which is connected to a shaft 38 and corresponding worm gear 36 to gear 34 which is connected to the rotatable shaft 28. In this way, the electric motor rotates the food support member 70 which is connected to the rotatable shaft 28. In a preferred embodiment, the drive mechanism 30 is designed to rotate the food support member 70 at approximately ½ to 2 RPMs and more particularly at 1 RPM. It is appreciated that other drive linkages may be utilized in connecting the rotational output of the electric motor 32 with the food support member 70. Additionally, the speed of rotation of the food support member may be varied to accommodate different cooking conditions.

It is appreciated that the cooking apparatus may be utilized to cook a variety of food items. For example, the cooking apparatus may be used to cook frozen pizzas, as well as hot hors d'oeuvres or sandwiches. In the following description of preferred embodiments, the cooking apparatus 10 will be described in the context of cooking a frozen pizza as a particular example of the present invention. Accordingly, the food support member 70 will be referred to as the pizza support member.

In one embodiment, the drive mechanism 30 preferably includes a fan 40 connected to the electric motor 32. This way, the fan blades draw air in through the air intake apertures 23 and the clearance gap 27 in the lower housing 20 and circulate the air to force the air out through corresponding apertures 54 and clearance gap 55 in the upper housing 50. The fan 40 thus provides for cooling of the pizza cooking apparatus 10 while still allowing for rapid cooking of the pizza on the pizza support member 70.

The upper housing 50 extends forward from the base 12 of the pizza cooking apparatus 10 at a position above the lower housing 20. The upper housing 50 is preferably positioned at approximately the same radial position as the lower housing 20. The upper housing 50 includes a base or shell portion 52 with a pie-shaped heating member 56 disposed at a lower bottom portion of the upper housing 50 facing the pizza support member 70. Preferably, an outer wall or rim 58 surrounds the heating member 56 so that heat generated from the heating member 56 is directed downward toward the pizza support member 70 which is disposed for rotation between the upper and lower housings 50, 20.

The upper and lower housings 50, 20, and the upper and lower heating members 56, 24 cover a pie-shaped section of pizza support member 70. The remaining portion of pizza support member 70 is outside of the upper and lower housings and the heating members. In use, a pizza disposed on rotating support member 70 is rotated relative to sections of the pizza passing between upper and lower housings 50, 20 to be heated by upper and lower heating members 56, 24.

Preferably, the upper housing 50 is disposed at a slight upward angle to assist in placement and removal of the pizza on the pizza support member 70, and also the pizza support member 70 on the lower housing 20. In one embodiment, the upper housing 50 is disposed at a 10 degree upward angle with respect to the horizontal axis.

The pizza support member 70 is preferably sized to support a round pizza thereon (the pizza 2 is shown in dashed lines in FIG. 1 disposed on the pizza support member 70). In one embodiment, the pizza support member is designed to support a 12 inch pizza which is a typical size for a frozen pizza. The pizza support member 70 includes a base member 71 with a central shaft or rod 72 extending down from the center of the pizza support member 70 for engagement with the rotatable shaft 28 extending upward from the lower housing 20. It is appreciated that a variety of connections may be utilized between the pizza support member 70 and the rotatable shaft 28 of the drive mechanism 30. In this way, the electric motor 32 of drive mechanism 30 is able to rotate the pizza support member about a central axis so that the base 71 of the pizza 70 support member 70 rotates between the upper and lower heating members 24, 56 of the upper and lower housings 50, 20.

In a preferred embodiment, a base portion 71 of the pizza support member 70 is preferably constructed of a solid material, preferably metal. In this way, as the pizza is cooked on the pizza support member 70, any drippings from the pizza such as oils or cheese are retained on the solid base 71 of the pizza support member. Preferably, the outer edge of the base 71 of the pizza support member includes a raised edge portion 73 so that any drippings from the pizza are contained within the pizza support member 70. This allows for easier cleaning of the lower housing 20 and the countertop, and also increases the safety of the pizza cooking apparatus by reducing the chance of drippings from the pizza falling within the lower heating member 24 of the lower housing 20. In a preferred embodiment, the pizza support member 70 further includes an outer annular rim 76 which extends downward from the base 71 of the pizza support member 70. This annular rim 76 helps stiffen the pizza support member 70 to help keep it from warping during heating and further serves to help retain heat within the base 71 of the pizza support member 70. It is appreciated that other designs for the pizza support member 70 may be utilized such as an open grill type structure.

Figure 6:
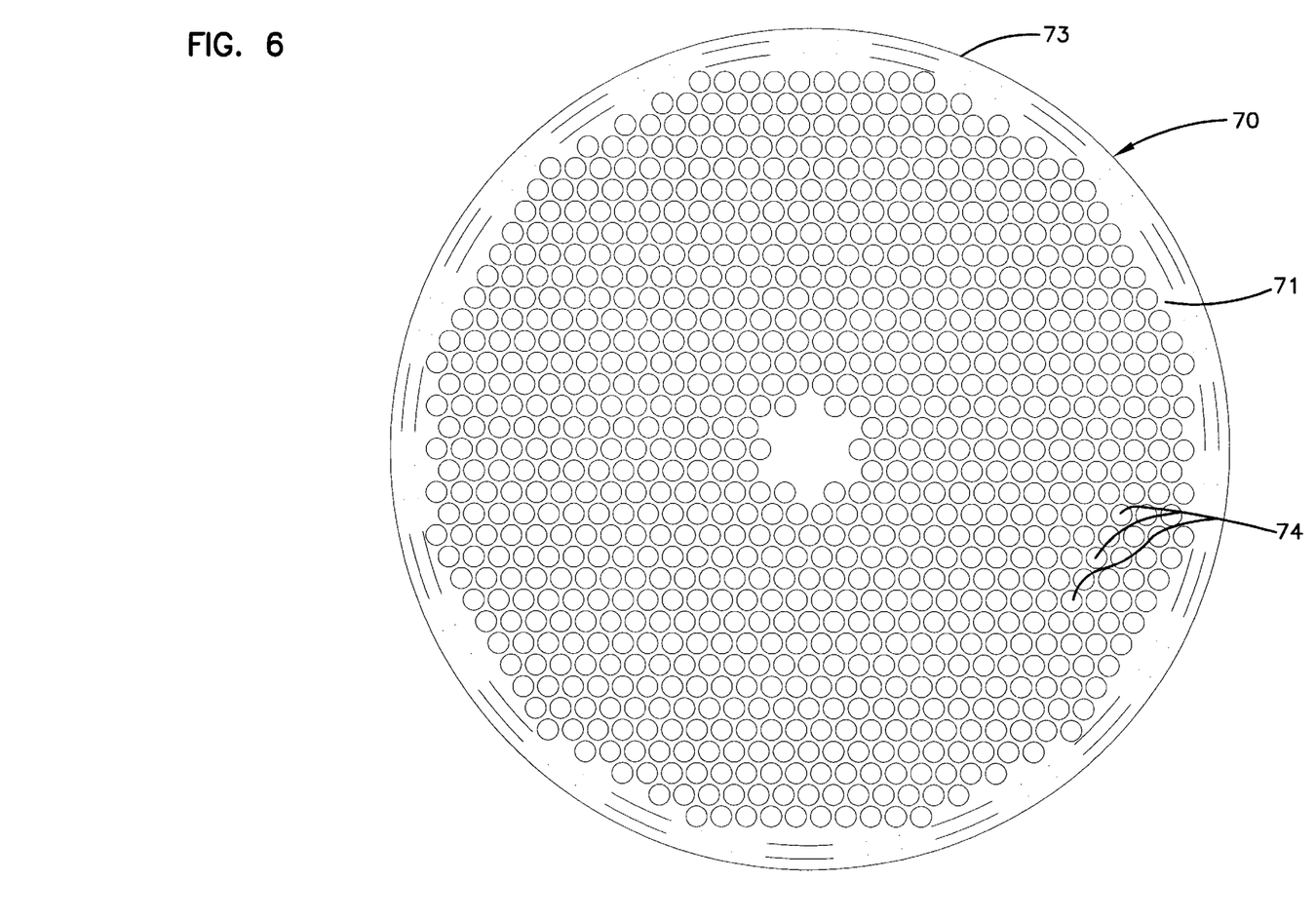
FIG. 6 is a top plan view of the food support member of the cooking apparatus shown in FIG. 1.

In a preferred embodiment, the solid base portion 71 of the pizza support member 70 includes a patterned surface 74 for contact with the crust of the pizza to cook thereon. In one embodiment as shown in FIG. 6, the solid base portion of the pizza support member 70 includes a waffle pattern with interruptions in the surface of the base 71. In this way, various air pockets are formed within the base 71 of the pizza support member 70 during cooking which allows the pizza cooking apparatus 10 to brown the crust of the pizza in an even manner. It is appreciated that other types of patterns may be utilized to provide interruptions in the base 71 of the pizza support member 70 to accomplish this result.

The pizza cooking apparatus 10 preferably includes a control panel 60 having control circuitry for use in controlling operation of the pizza cooking apparatus. In one embodiment as shown in FIG. 1, the control panel 60 is located on an upper portion of the base 12 of the pizza cooking apparatus for easy access by a user. The control panel 60 may include switches and a timer for turning on the heating members 24, 56 of the upper and lower housings 50, 20 for cooking the pizza. The control panel 60 further controls the operation of the electric motor 32 of the drive mechanism 30 to rotate the pizza support member 70 and to operate the fan 40 to cool the outer surfaces of the pizza cooking apparatus. It is contemplated that the control panel 60 may include control circuitry to allow a user to vary the operation of the heating members of the upper and lower housings 50, 20 to customize the heat applied to the pizza.

Figure 10A:
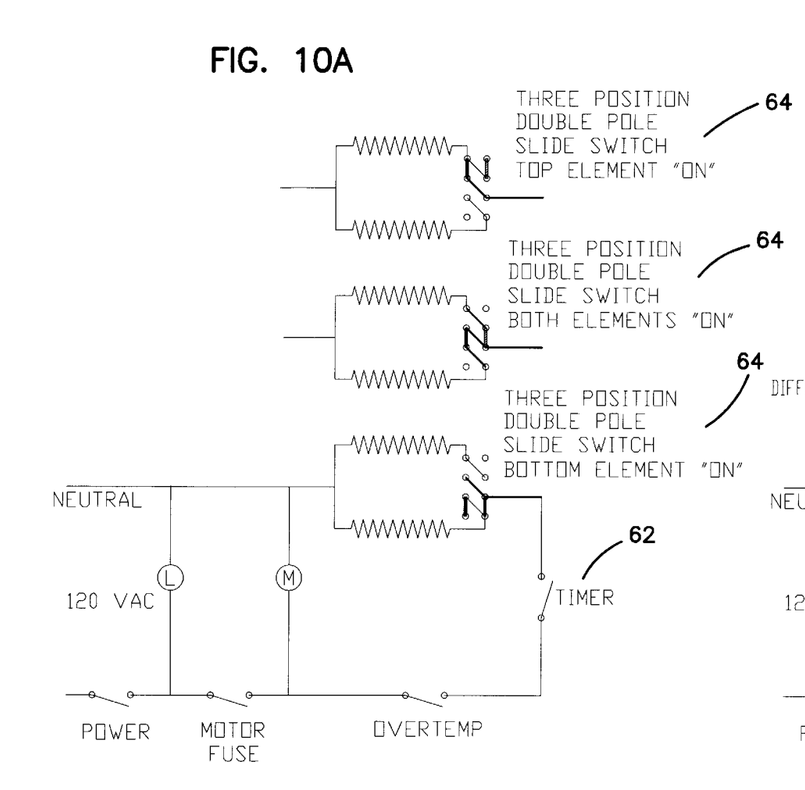
FIG. 10A is an electrical schematic diagram of one embodiment of electrical circuitry for use in a cooking apparatus according to the principles of the present invention.
Figure 10B:
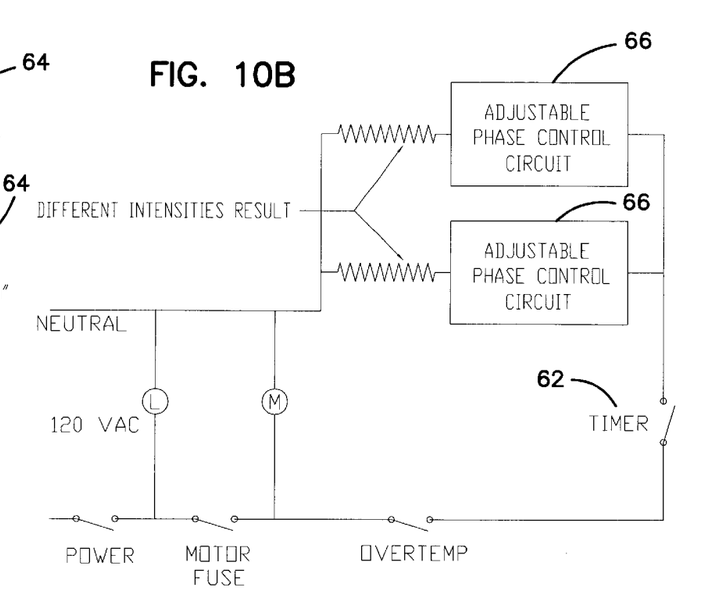
FIG. 10B is an electrical schematic diagram of a second alternative embodiment of electrical circuitry for use in a cooking apparatus according to the principles of the present invention.

For example, if a user desires to cook the pizza so that the crust is cooked more than the top of the pizza, the control panel 60 could allow the user to turn down or off the upper heating member 56 while still providing heat through the lower heating member 24 to further cook the crust of the pizza disposed on the pizza support member 70. In the embodiment shown in FIG. 10A, the control circuitry includes a timer 62 and a three position double pole slide switch 64 to allow the user to operate the upper and lower heating members independent from each other. As another example, the control panel 60 could be used to vary the wattage of the heating members so that the user could increase or decrease the amount of heat being supplied by either the upper or lower heating members. In the embodiment shown in FIG. 10B, the control circuitry includes a timer 62 and an adjustable phase control circuit 66 for the upper and lower heating members to vary the intensity of the heating members. It is further contemplated that a timer 62 may be utilized with the control panel 60 so that the user can set the timer for a predetermined time period and then the pizza cooking apparatus is activated to cook the pizza through the lower and upper heating members 24, 56 while rotating the pizza support member 70. After the predetermined time, the pizza cooking apparatus would then turn itself off and the pizza would be fully cooked and ready to eat by the user. It is appreciated that variations may be utilized in the control panel to provide a variety of cooking options for the user. It is further noted that the location of the control panel may be varied as long as it provides easy access for the user.

Turning now to the operation of the pizza cooking apparatus 10 for cooking a pizza, the user places the pizza support member 70 on the lower housing 20 through the connection of the shaft or rod 72 and the rotatable shaft 28 extending up from the lower housing 20. It is appreciated that the pizza support member 70 may be preassembled, and permanently affixed if desired. The user then places a pizza on the pizza support member 70. The pizza support member may be sized to fit a particular size of pizza. In the preferred embodiment, the pizza support member is sized to fit a standard 12 inch frozen pizza on the upper surface of the pizza support member. The user then utilizes the control panel 60 which may include an ON/OFF switch and preferably may include a timer for cooking of the pizza. The pizza cooking apparatus 10 is turned on at which time the electric motor 32 of the drive mechanism 30 begins to rotate the pizza support member 70 and the pizza contained thereon through the heating members 56, 24 of the upper and lower housings 50, 20.

Figure 2:
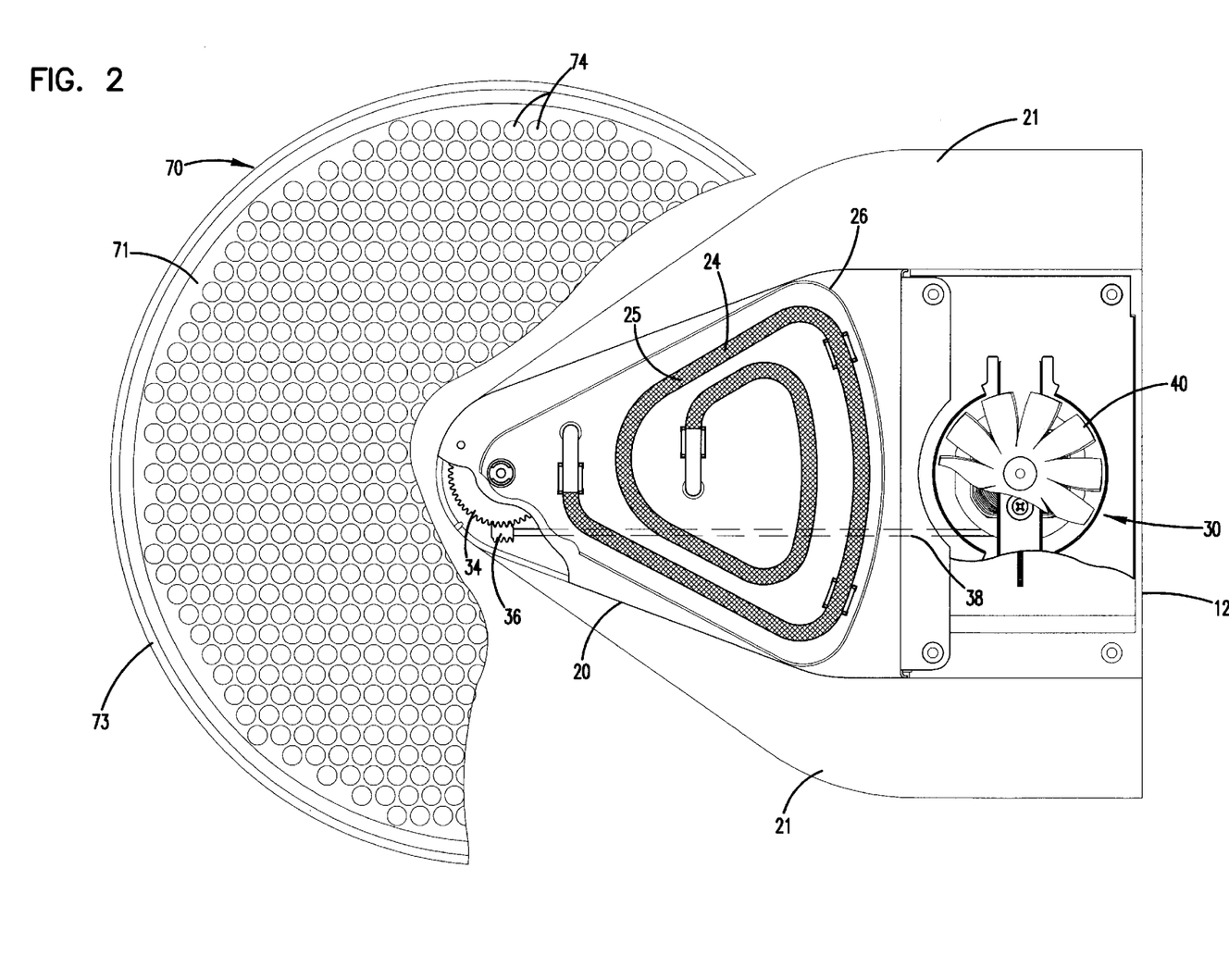
FIG. 2 is a partial sectional top plan view of the cooking apparatus as shown in FIG. 1.
Figure 3:
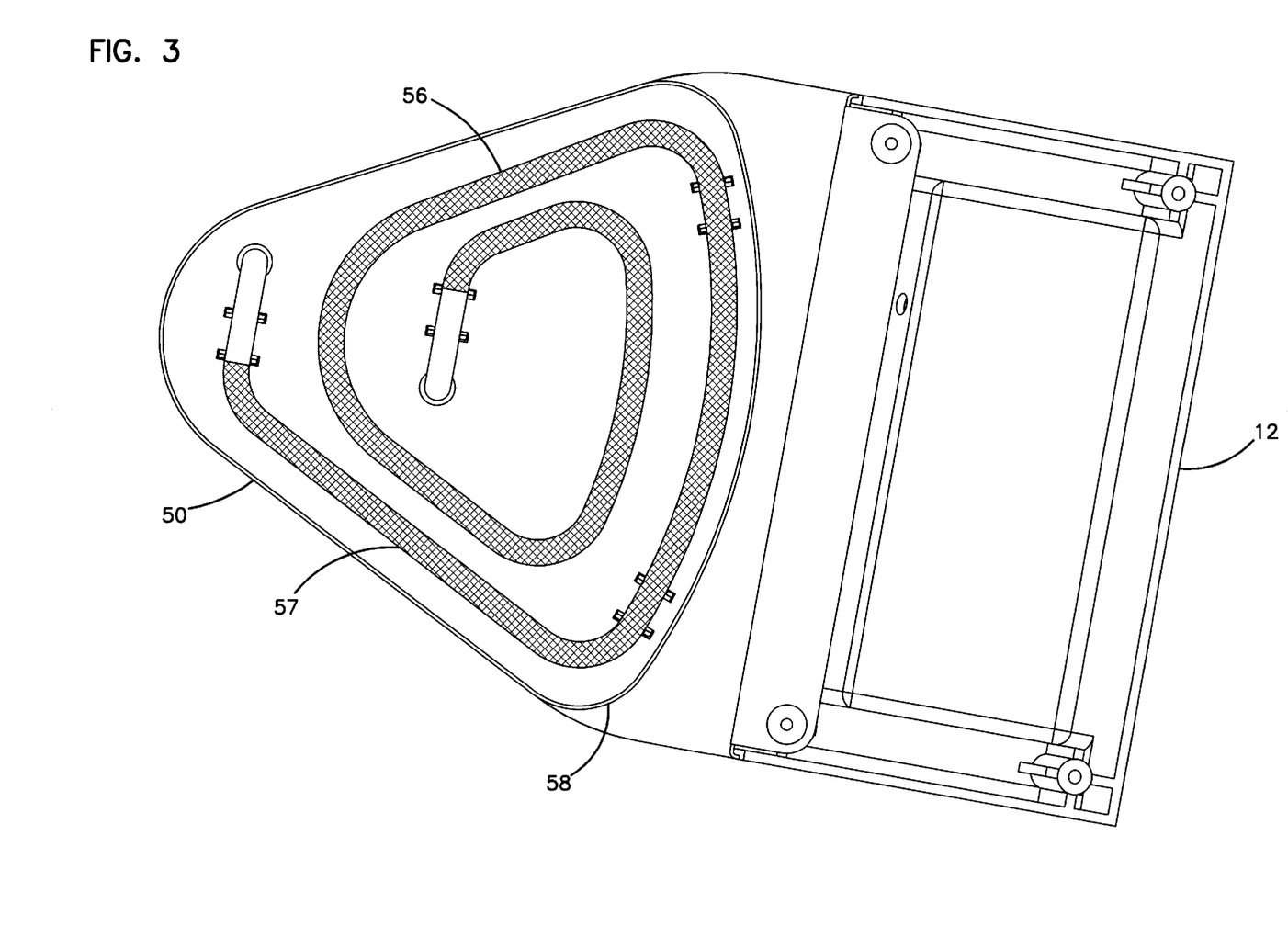
FIG. 3 is sectional bottom view of an upper portion of the cooking apparatus as shown in FIG. 1.
Figure 4:
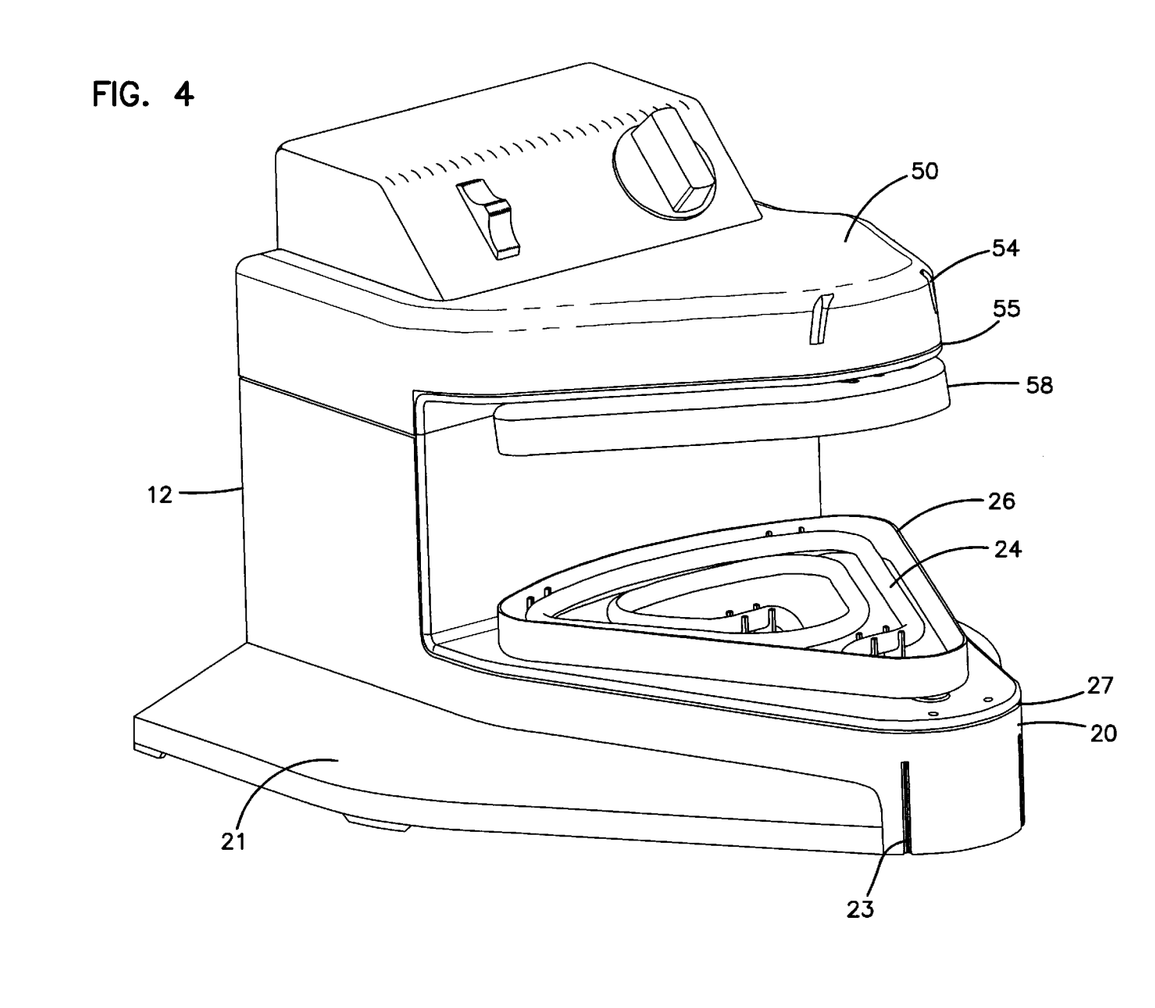
FIG. 4 is a perspective view of the cooking apparatus shown in FIG. 1 without the food support member.
Figure 5:
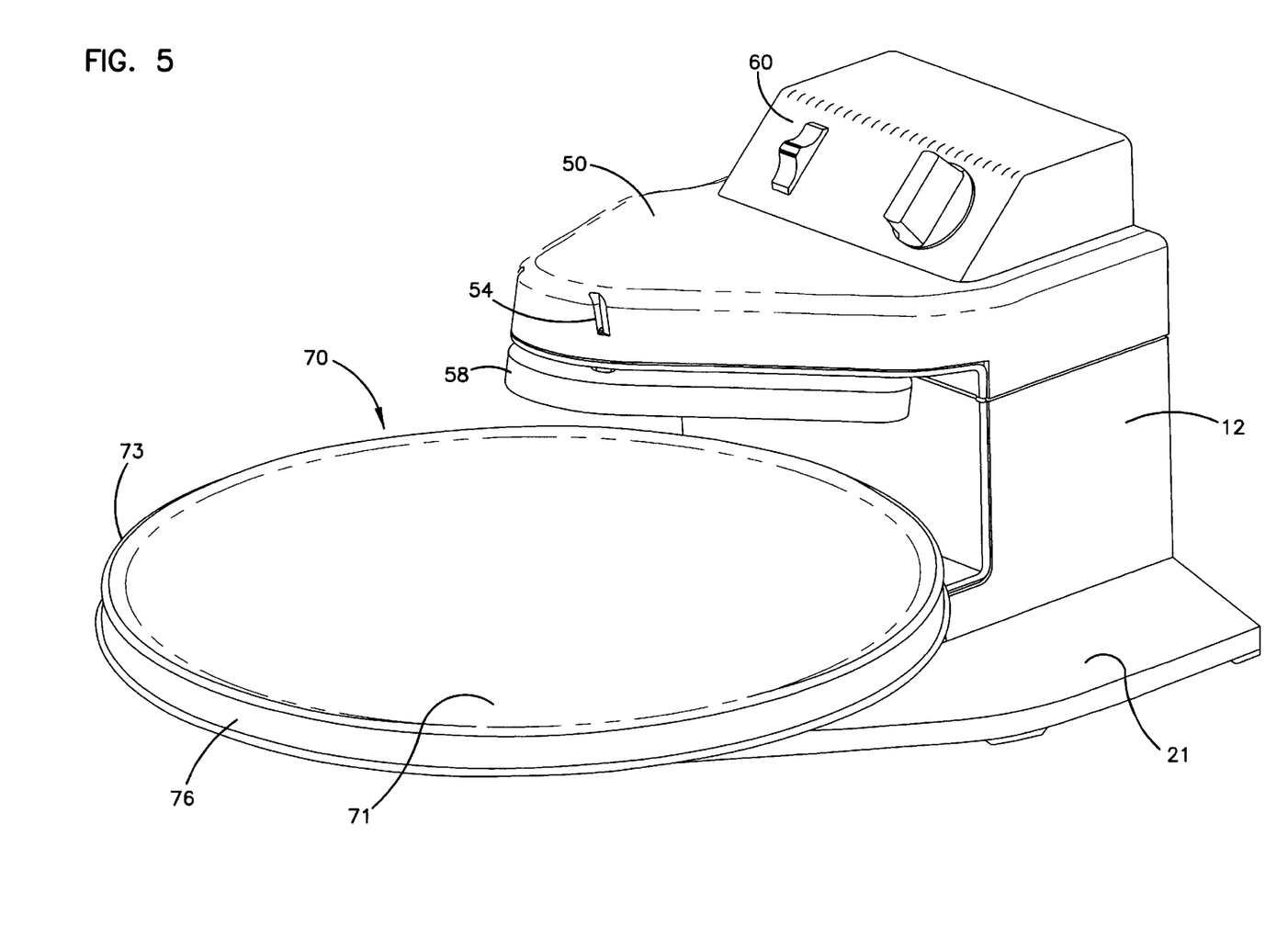
FIG. 5 is a perspective view of the cooking apparatus shown in FIG. 1.

The heating members 24, 56 contained within the lower and upper housings are activated to begin providing heat. In the preferred embodiment, the upper and lower heating members 24, 56 constitute sheathed metal heating elements 25, 57. The heating members 24, 56 begin to heat up and apply heat to begin to cook the pizza rotating through upper and lower heating members. As shown in FIGS. 2 and 3, the upper and lower heating members 56, 24 are positioned within a pie-shaped portion of the upper and lower housings 50, 20 such that a greater portion of the heating elements 25, 57 of the heating members 24, 56 are disposed adjacent the outer edge of the pizza support member 70. In this way, the upper and lower heating members 56, 24 supply a greater output of heat to the outer portion of the pizza support member 70 and consequently the pizza contained thereon since as the pizza rotates, the center portion of the pizza remains adjacent to the heat supplied by the heating members while the outer edge portion of the pizza rotates in and out of the heat supplied by the upper and lower heating members. In this way, the positioning of the heating elements in a pie-shaped orientation allows for application of varied heating throughout a pie-shaped (or radius) section of the pizza so that the entire pizza is cooked evenly and proportionately. It is appreciated that numerous variations in the shaping of the heating elements 25, 57 of the heating members 24, 56 can be utilized while still providing for variable heat output between the center and the edge of the pizza so that the heating members apply greater heat output toward the outer edge of the pizza support member 70 than is supplied in the center portion of the pizza support member.

As the pizza support member rotates the pizza between the lower and upper heating members 24, 56 of the housings, the waffle pattern 74 of the solid base 71 of the pizza support member 70 allows for even browning of the pizza crust as the pizza cooks. In this way, the pizza cooking apparatus cooks the pizza in such a way that the entire pizza is cooked evenly with the crust being sufficiently cooked as the top of the pizza cooks. Additionally, it should be noted that the present invention allows for easy visual inspection of the pizza during cooking as the pizza contained on the pizza support member is rotating within view of the user.

Preferably, during use, the electric motor 32 of the drive mechanism 30 also drives a fan 40 within the base 12 of the pizza cooking apparatus 10. In this way, air is circulated from apertures 23 and clearance gap 27 within the lower housing 20 through the base portion 12 of the pizza cooking apparatus and out through apertures 54 and clearance gap 55 in the upper housing 50. Circulation of air by the fan 40 allows for cooling of the pizza cooking apparatus to prevent a user from burning themselves by touching of the outer surfaces of the pizza cooking apparatus during use. It is appreciated that the number of apertures and direction of air flow may be varied while still providing for adequate cooling of the outer surfaces of the pizza cooking apparatus.

It is further noted that preferably the outer annular rim 76 of the pizza support member 70 is disposed adjacent the outer wall or rim 26 of the lower housing 20. In this way, the pizza support member 70 and the outer wall 26 of the lower housing 20 cooperate to form a substantially closed chamber for the lower heating member 24 which increases the efficiency of the pizza cooking apparatus. This also serves to prevent access to the heating member 24 contained in the lower housing 20. This helps prevent access by a user and further prevents food particles or drippings from falling or migrating into the heating member 24 of the lower housing 20.

When the pizza is fully cooked, the user then stops rotation of the pizza support member 70 through the control panel 60 (or the apparatus may automatically stop cooking pursuant to a timer mechanism) and removes the pizza from the pizza support member to consume the pizza. Alternatively, the user may remove the pizza support member containing the pizza and use the pizza support member 70 as a serving tray. At this time, the heating members 24, 56 of the lower and upper housings are turned off.

In operation, the cooking apparatus of the present invention provides for fast, efficient and even cooking of a pizza. For example, a 12 inch frozen pizza may be cooked in approximately 12 minutes using one embodiment of the pizza cooking apparatus 10. Additionally, the sizing of the lower and upper heating members 24, 56 to cover only a pie-shaped portion of the pizza support member 70 allows for a relatively small size or footprint of the pizza cooking apparatus so that the pizza cooking apparatus may be easily stored on a counter in a kitchen. For storage, the pizza support member 70 may be removed and stored separately from the rest of the cooking apparatus. In a preferred embodiment, the upper and lower housings 50, 20 each include a pie-shaped portion which is less than or equal to about one-quarter of the total surface area of the pizza support member 70. The illustrated embodiment is about one-sixth of the total surface area Other embodiments, up to one-half of the pizza support member surface area may be advantageously employed.

Figure 7:
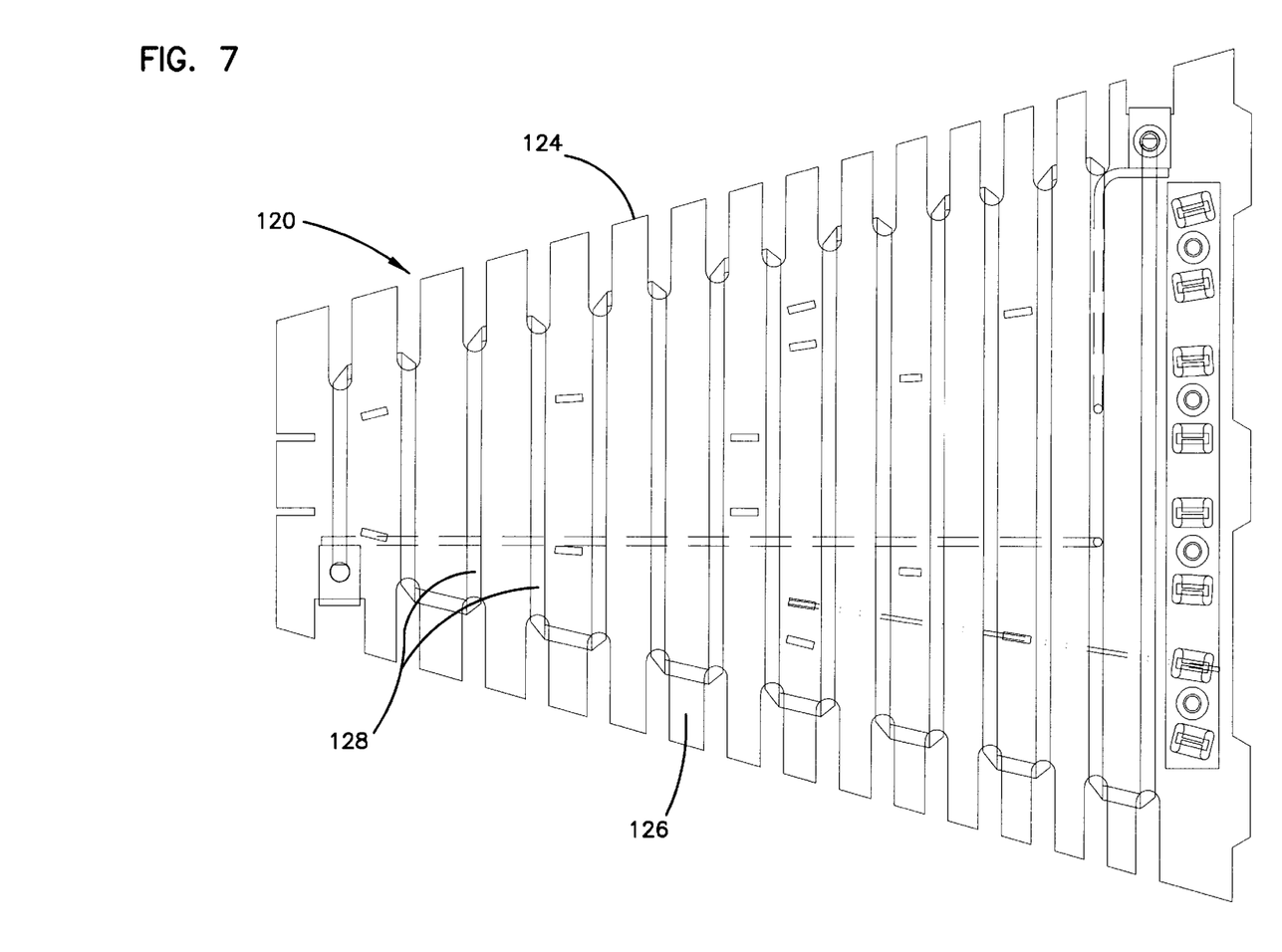
FIG. 7 is a top plan view of a heating member for a first alternative embodiment of a cooking apparatus according to the principles of the present invention.

While one embodiment of the present invention discloses a sheathed heating elements 25, 57 to provide the heat for cooking a pizza, it is appreciated that a variety of other heating elements may be utilized in accordance with the principles of the present invention. For example, referring to FIG. 7, an alternative heating member is provided. In FIG. 7, the lower heating member 124 of the lower housing 120 includes a base portion 126 wherein a resistance wire 128 is wrapped around the base 126 of the lower heating member 124. The base portion 126 is preferably provided in a pie-shaped portion and the spacing between the resistance wire 128 disposed around the base portion may be varied to vary the heat output of the heating member 124. For example, as shown in FIG. 7, the spacing between the resistance wire 128 may be greater near the front end of the assembly with the spacing decreasing toward the outer edge of the heating member. In this way, less heat is applied toward the front end of the heating member 124 and consequently greater heat output toward the outer edge of the heating member. This variation of the heat output provides for even cooking of the pizza which is rotating on the pizza support member 70 above the heating member 124. A similar type heating member would be used for the upper heating member as well. In such an embodiment, it is preferable to have some type of screen or glass cover over the heating member 124 of the lower housing so that no drippings, crumbs or toppings from the pizza may gain access to the heating member 124 containing the live resistance wire 128.

Figure 8:
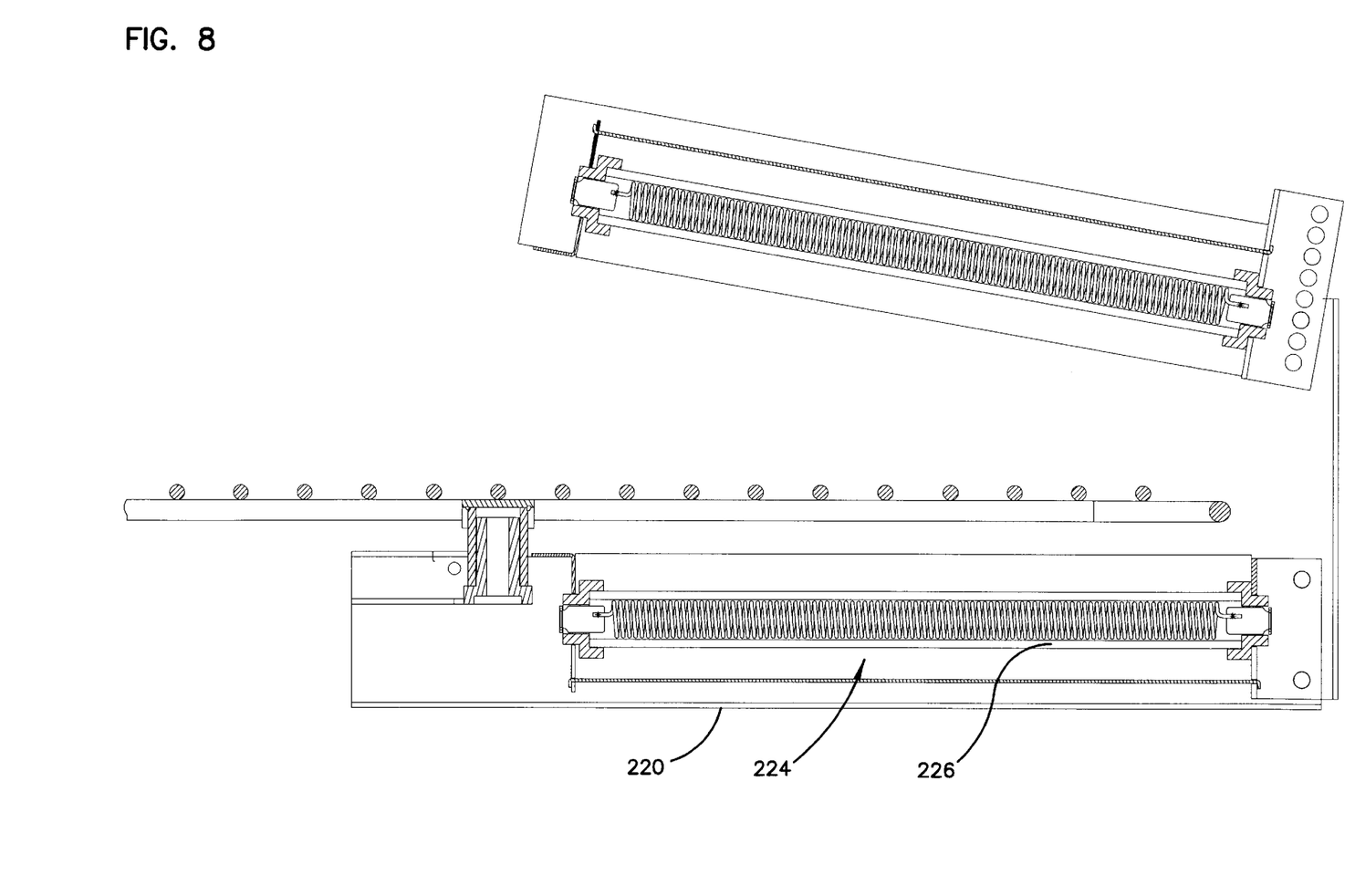
FIG. 8 is a side sectional view of a second alternative embodiment of a cooking apparatus according to the principles of the present invention.
Figure 9:
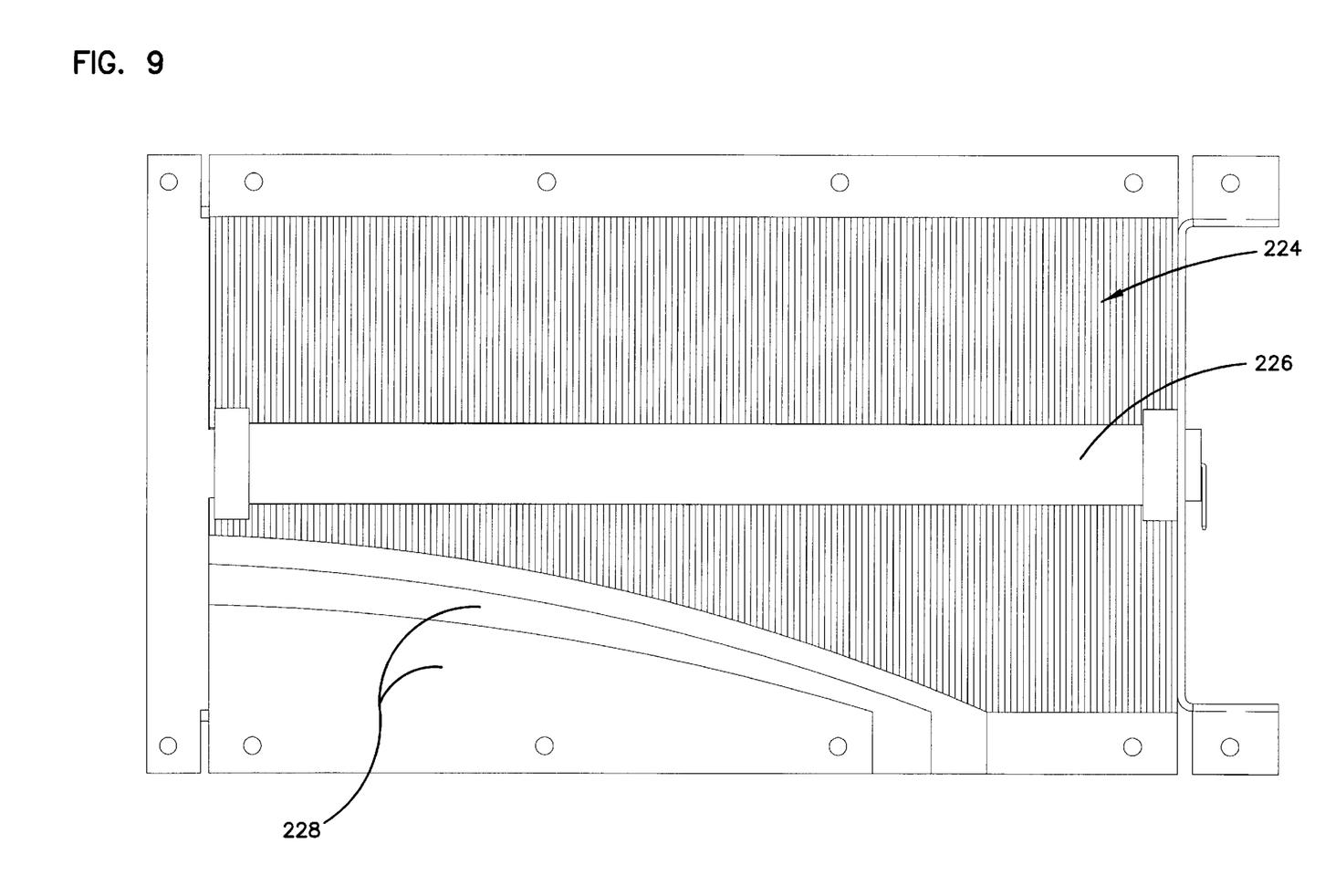
FIG. 9 is a top sectional view of a portion of the cooking apparatus shown in FIG. 8.

Referring to FIG. 8, a second alternative embodiment for the heating member is disclosed. In this embodiment, the heating member 224 includes a quartz tube 226 disposed within the lower housing 220 to apply heat to the pizza support member. Referring to FIG. 9. deflector shields 228 are applied to provide a varied heat output. The deflector shields are disposed to form a pie-shaped heating section so that the quartz tube 226 applies heat in a substantially pie-shaped pattern to the pizza support member. This allows for even heating of the pizza rotating on the pizza support member. Preferably, a screen or glass shield would be disposed between the pizza support member and the quartz tube 226 to prevent any access to the quartz tube heating element by the user and to prevent any drippings or crumbs from the pizza being cooked from reaching the quartz tube. Alternatively, the quartz tube could have an opaque material applied to the quartz tube to vary the heat output along the length of the quartz tube.

It is to be understood that even though numerous characteristics and advantages of various embodiments of the present invention have been set forth in the foregoing description, together with the details of the structure and function of various embodiments of the invention, this disclosure is illustrative only and changes may be made in the details, especially in matters of shape, size, and arrangement in part within the principles of the present invention, to the full extent indicated by the broad general meaning of the terms in which the appended claims are expressed. All alternative modifications and variations of the present invention which fall within the spirit and broad scope of the appended claims are covered.

What is claimed is:

1. A cooking apparatus comprising:
   a rotatable food support member having a top surface for supporting a food item thereon;
   a drive mechanism connected to the food support member for rotating the food support member;
   a lower heating member disposed beneath the food support member, the lower heating member including a heating element and a lower housing with the heating element disposed along the lower housing, the heating element and lower housing formed in a shape such that the heating element and lower housing have a greater surface area disposed adjacent an outer edge portion of the food support member than disposed adjacent an inner center portion of the food support member;
   an upper heating member disposed above the food support member, the upper heating member including a heating element and an upper housing with the heating element disposed along the upper housing, the heating element and upper housing formed in a shape such that the heating element and upper housing have a greater surface area disposed adjacent an outer edge portion of the food support member than disposed adjacent an inner center portion of the food support member;
   wherein the upper and lower heating members define a chamber covering only a portion of the food support member wherein no dimension of the chamber is greater than an outer diameter of the food support member parallel to the top surface;
   wherein the upper and lower heating members are positioned above and below the food support member at substantially similar radial positions such that as the food support member rotates, the upper and lower heating members apply heat to the food item carried by the food support member to cook the food item.

2. The apparatus of claim 1 wherein the upper and lower heating members are shaped such that the total surface area of the heating element and housing of each of the heating members adjacent the food support member is equal to or less than about one quarter of the total surface area of the food support member.

3. The apparatus of claim 1 wherein the rotatable food support member comprises a solid base portion for supporting the food item.

4. A pizza cooking apparatus comprising:
   a generally circular, rotatable food support member for supporting a food item thereon, the food support member adapted to be disposed in a substantially horizontal orientation during operation of the cooking apparatus, wherein the food support member includes a substantially planar top surface for holding a pizza thereon;
   a drive mechanism connected to the food support member for rotating the food support member, the drive mechanism including a center drive shaft having a removable connection with a portion of the food support member;
   wherein upper and lower housings disposed above and beneath the food support member define a chamber such that the upper and lower housings cover only a portion of the food support member wherein no dimension of the chamber is greater than an outer diameter of the food support member parallel to the top surface, the upper and lower housings including an upper and lower heating member respectively, the food support member being removable from its horizontal position between the upper and lower housings;
   wherein the drive mechanism rotates the food support member with the upper and lower heating member applying heat to a portion of the food support member to cook the pizza.

5. Apparatus of claim 4 wherein the upper and lower heating members each define a pie-shaped portion.

6. The apparatus of claim 4 wherein the food support member includes a solid base portion for supporting the pizza.

7. The apparatus of claim 4 wherein the food support member includes a downwardly extending annular rim.

8. The apparatus of claim 4 wherein the food support member includes an upper annular rim that extends upwardly to further retain the pizza on the top surface of the food support member.

9. The apparatus of claim 4 wherein the food support member includes a solid base portion for supporting the pizza and a downwardly extending annular outer rim and wherein the lower heating member is at least partially received within a lower chamber defined by the base portion and the outer downwardly extending annular rim of the food support member.

10. A pizza cooking apparatus comprising:
    a generally circular, rotatable food support member for supporting a food item thereon, the food support member adapted to be disposed in a substantially horizontal orientation during operation of the cooking apparatus, wherein the food support member includes a solid horizontal base portion having a top surface for holding a pizza thereon and a downwardly extending outer annular rim;
    a drive mechanism connected to the food support member for rotating the food support member, the drive mechanism including a center drive shaft having a removable connection with a portion of the food support member;
    wherein upper and lower housings disposed above and beneath the food support member define a chamber such that the upper and lower housings cover only a portion of the food support member wherein no dimension of the chamber is greater than an outer diameter of the food support member parallel to the top surface, the upper and lower housings including an upper and lower heating member respectively, the food support member being removable from its horizontal position between the upper and lower housing;
    wherein the lower heating member is at least partially received within a lower chamber defined by the base portion and the outer downwardly extending annular rim of the food support member;
    wherein the drive mechanism rotates the food support member with the upper and lower heating members applying heat to a portion of the food support member to cook the pizza.

11. The apparatus of claim 10 wherein the drive mechanism includes a drive shaft including a top end, and wherein the base portion of the food support includes a lower shaft with a bottom end, wherein the bottom end of the lower shaft of the food support member rests on the top end of the drive shaft at a location below the top surface of the food support member to define the removable connection.

12. The apparatus of claim 10 wherein the food support member includes an upper annular rim that extends upwardly to further retain the pizza on the top surface of the support member.

13. A pizza cooking apparatus comprising:

a generally circular, rotatable food support member for supporting a food member thereon, the food support member adapted to be disposed in a substantially horizontal orientation;

a drive mechanism connected to the food support member for rotating the food support member;

upper and lower housings disposed above and beneath the food support member such that the upper and lower housings cover only a portion of the food support member, the upper and lower housings including an upper and lower heating member respectively, wherein the upper housing including the heating member is disposed at an upward angle with respect to the food support member;

wherein the upper and lower housings define a chamber covering only a portion of the food support member wherein no dimension of the chamber is greater than an outer diameter of the food support member parallel to the top surface;

wherein the drive mechanism rotates the food support member with the upper and lower heating members applying heat to a portion of the food support member to cook the food item.

14. A pizza cooking apparatus comprising:

a generally circular, rotatable food support member for supporting a food item thereon, the food support member adapted to be disposed in a substantially horizontal orientation during operation of the cooking apparatus, wherein the food support member includes a substantially solid horizontal base portion having a top surface for holding the pizza thereon, and a lower shaft with a bottom end;

a drive mechanism connected to the food support member for rotating the food support member, the drive mechanism including a drive shaft including a top end and having a removable connection with the lower shaft of the food support member, wherein the bottom end of the lower shaft of the food support member rests on the top end of the drive shaft at a location below the top surface of the food support member to define the removable connection;

wherein upper and lower housings disposed above and beneath the food support member define a chamber such that the upper and lower housings cover only a portion of the food support member wherein no dimension of the chamber is greater than an outer diameter of the food support member parallel to the top surface, the upper and lower housings including an upper and lower heating member respectively, the food support member being removable from its horizontal position between the upper and lower housings;

wherein the drive mechanism rotates the food support member with the upper and lower heating members applying heat to a portion of the food support member to cook the pizza.

* * * * *